(12) United States Patent
Heim et al.

(10) Patent No.: US 8,291,070 B2
(45) Date of Patent: Oct. 16, 2012

(54) DETERMINING AN OPERATING STATUS OF A REMOTE HOST UPON COMMUNICATION FAILURE

(75) Inventors: Itamar Heim, Tel Aviv (IL); Shahar Frank, Ramat Hasharon (IL)

(73) Assignee: Red Hat Israel, Ltd., Raanana (IL)

( * ) Notice: Subject to any disclaimer, the term of this patent is extended or adjusted under 35 U.S.C. 154(b) by 469 days.

(21) Appl. No.: 12/551,165

(22) Filed: Aug. 31, 2009

(65) Prior Publication Data

US 2011/0055375 A1    Mar. 3, 2011

(51) Int. Cl.
G06F 15/173    (2006.01)
G06F 15/167    (2006.01)

(52) U.S. Cl. .......... 709/224; 709/213; 709/223; 710/19; 711/161; 714/2

(58) Field of Classification Search .......... 709/223–226, 709/212–213, 238–239; 710/15, 19; 711/161–162; 714/1, 2; 718/1
See application file for complete search history.

(56) References Cited

U.S. PATENT DOCUMENTS

| | | | | |
|---|---|---|---|---|
| 6,772,304 B2 * | 8/2004 | Hino et al. | ...... | 711/162 |
| 6,944,654 B1 * | 9/2005 | Murphy et al. | ...... | 709/223 |
| 7,136,855 B2 * | 11/2006 | Saika | ...... | 709/223 |
| 7,779,170 B2 * | 8/2010 | Sinclair et al. | ...... | 710/19 |
| 7,818,615 B2 * | 10/2010 | Krajewski et al. | ...... | 714/13 |
| 8,024,442 B1 * | 9/2011 | Roussos et al. | ...... | 709/223 |
| 8,055,751 B2 * | 11/2011 | Riordan et al. | ...... | 709/224 |

OTHER PUBLICATIONS

"Solid Ice: Provisioning Manager," Qumranet, Apr. 2008, 5 pages.
"Solid Ice: Virtual Desktop Server (VDS)," Qumranet, Apr. 2008, 6 pages.
"Solid Ice: Connection Broker," Qumranet, Apr. 2008, 7 pages.
"Solid Ice: Overview," Qumranet, Apr. 2008, 15 pages.
"KVM—Kernel-based Virtualization Machine," Qumranet, white paper, 2006, 5 pages.

* cited by examiner

*Primary Examiner* — Bharat N Barot
(74) *Attorney, Agent, or Firm* — Lowenstein Sandler PC

(57) ABSTRACT

Methods for monitoring operating statuses of hosts are described herein. Operating statuses for one or more hosts are monitored by a management server over a network using a network management protocol. In response to a failure to obtain an operating status of a first host over the network using the network management protocol, the management server instructs a second host to access a predetermined storage location to obtain the operating status of the first host. The predetermined storage location is specifically allocated for the first host from a storage space shared by all the hosts. Thereafter, the management server is configured to determine an operating condition of the first host based on the operating status obtained via the second host.

21 Claims, 5 Drawing Sheets

DETERMINING AN OPERATING STATUS OF A REMOTE HOST UPON COMMUNICATION FAILURE

TECHNICAL FIELD

Embodiments of the present invention relates generally to network computing. More particularly, embodiments relate to techniques for monitoring operating statuses of remote hosts.

BACKGROUND

Generally, the concept of virtualization in information processing systems allows multiple instances of one or more operating systems to run on a single system, even though each operating system (OS) is designed to have complete, direct control over the system and its resources. Virtualization is typically implemented by using software (e.g., a virtual machine monitor, or a "VMM") to present to each OS a "virtual machine" ("VM") having virtual resources, including one or more virtual processors, that the OS may completely and directly control, while the VMM maintains a system environment for implementing virtualization policies such as sharing and/or allocating the physical resources among the VMs (the "virtualization environment"). Each OS, and any other software, that runs on a VM is referred to as a "guest" or as "guest software," while a "host" or "host software" is software, such as a VMM, that runs outside of, and may or may not be aware of, the virtualization environment.

The virtualization technologies have wide applications in the computer field with the development of computer systems. For example, such virtualization technologies can be used to implement a virtual desktop application which runs within a virtual machine and can be accessed from a client over a network, such as, for example, SolidICE™ available from Qumranet, Inc. of Israel, a subsidiary of Red Hat, Inc. of Raleigh, N.C.

Typically, when a management server fails to communicate with a host over a network, it is assumed that the host is still up and running. The reason that a host cannot be "seen" is either there is a network problem or a problem within the host. If it is a host's problem, the host may need to be shut down, for example, to release network resources that it might still be using. There has been a lack of efficient ways for a management server to determine whether there is a network problem or a problem within a host when the management server fails to communicate with the host.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
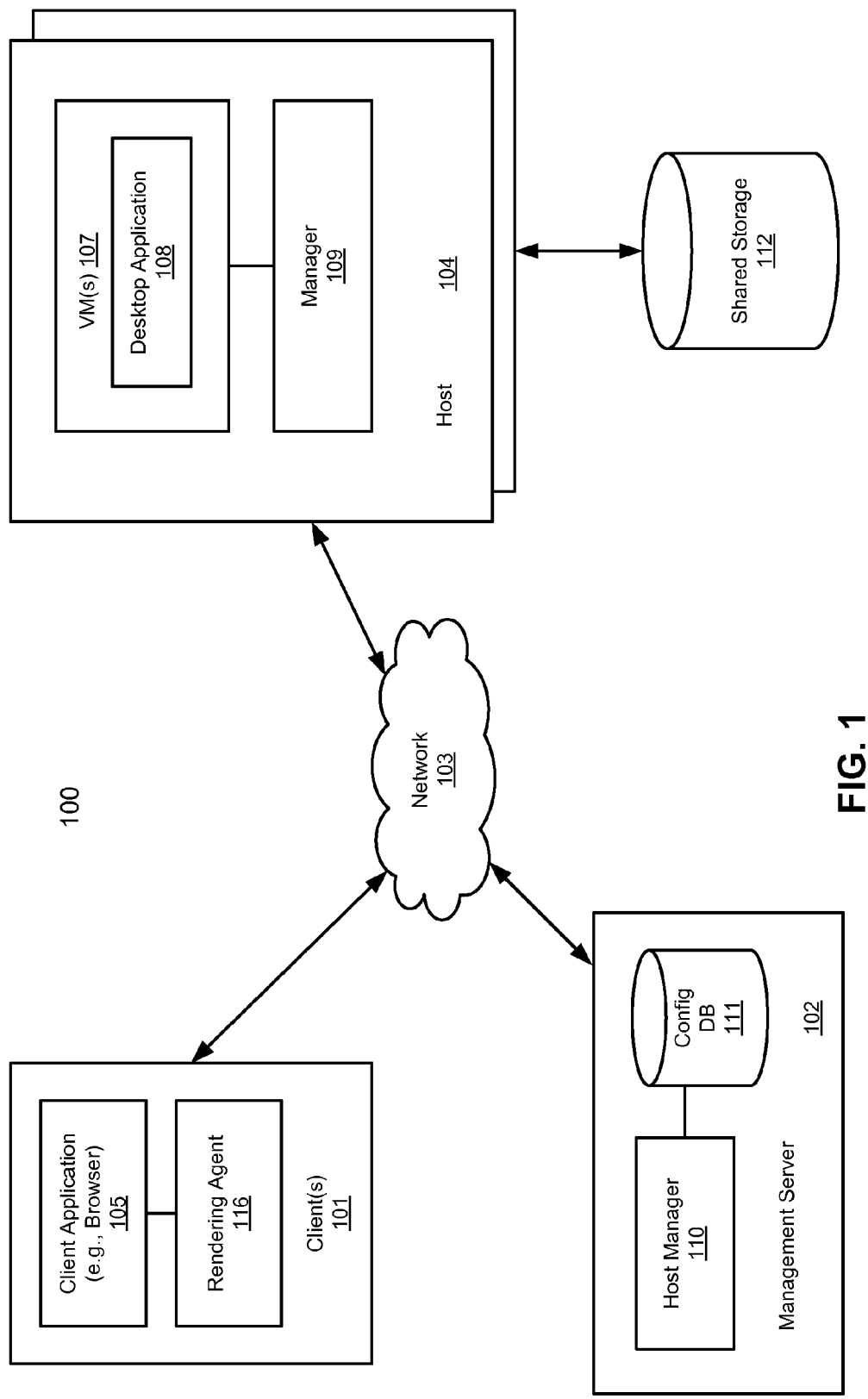
FIG. 1 is a block diagram illustrating an example of a network configuration according to one embodiment of the invention.

Techniques for monitoring operating statuses of a host are described herein. In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

As described above, when a management server fails to communicate with a host over a network, there could be a variety of reasons. One reason that the host cannot be "seen" is either there is a network problem or a problem within the host. It is difficult for a management server to determine whether there is a network problem or a problem within a host when the management server fails to communicate with the host.

According to some embodiments, a storage space (e.g., a disk or disks) is configured to be shared among multiple hosts, where the shared storage space acts a backup communications channel when a normal communications channel between a management server and host over a network is down. In one embodiment, each of the hosts is configured to write certain operating status data to a predetermined storage location of the shared storage space. When a management server fails to communicate with a first host over a normal communications channel (e.g., simple network management protocol or SNMP communications channel) over a network, the management server can invoke a second host to access the predetermined storage location associated with the first host to retrieve the operating status data that has been written therein by the first host. Based on the retrieved operating status data via the second host, the management server can determine the actual operating status of the first host (e.g., whether it is a network problem or a problem within the first host).

In addition, the shared storage space can also be used as a backup communication channel between the first and second hosts. For example, a second host can write one or more commands to a shared disk to allow the first host to read those commands. In response to the commands read from the shared disk, the first host may perform certain operations and store the outputs of the operations to the shared disk to allow the second host to retrieve such outputs. Thus, instead of communicating over a network, the first and second hosts can communicate with each other using the shared storage space. In this situation, the management server and the first host can communicate with each other, using the second host as a proxy, where the shared storage is used as a communications channel between the first and the second hosts.

FIG. 1 is a block diagram illustrating an example of a network configuration according to one embodiment of the invention. Referring to FIG. 1, network configuration 100 includes, but is not limited to, one or more clients 101 communicatively coupled to a remote server or a cluster of servers 104 over a network 103. Network 103 may be a local area network (LAN) or a wide area network (WAN) and may be a combination of one or more networks. Client 101 can be any computer system in communication with server 104 for remote execution of applications at server 104.

For example, system 100 may be implemented as part of a graphics remoting system. Generally, a client such as client 101 can be a computer system in communication with server 104 for remote execution of applications at server 104. Thus, input data (e.g., mouse and keyboard input) representing application commands is received at the client and transferred over network 103 to server 104. In response to client side data, an application (e.g., desktop application 108) can generate output display commands (e.g., graphics commands, simply referred to herein as graphics data), which may include one or more paint and/or draw operations, for example, in the form of executable instructions. The output display commands can then be transmitted (e.g., as graphics update commands) with an optional compression back to the remote client and a remote display driver (e.g., a rendering agent 116) of the remote client can collect the graphics commands and generate corresponding drawing commands for rendering at a display device of the client. Note that a desktop application is utilized herein as an example; however, any other application may also be applied.

In one embodiment, server 104 is configured to host one or more virtual machines 107, each having one or more desktop applications 108 (e.g., desktop operating system). Desktop application 108 may be executed and hosted by an operating system within virtual machine 107. Such an operating system in virtual machine 107 is also referred to as a guest operating system. Multiple guest operating systems and the associated virtual machines may be controlled by another operating system (also referred to as a host OS). Typically, a host OS represents a virtual machine monitor (VMM) (also referred to as a hypervisor) for managing the hosted virtual machines. A guest OS may be of the same or different type with respect to the host OS. For example, a guest OS may be a Windows™ operating system from Microsoft and a host OS may be a Linux operating system available from Red Hat.

Virtual machine 107 can be any type of virtual machines, such as, for example, hardware emulation, full virtualization, para-virtualization, and operating system-level virtualization virtual machines. Different virtual machines hosted by server 104 may have the same or different privilege levels for accessing different resources.

System 100 may be implemented as part of a server or a cluster of servers within a data center of an enterprise entity. It allows enterprises the benefit of centralized desktops without the need to change their applications or infrastructure. Enterprises benefit from an improvement in the manageability, security and policy enforcement for their desktop environment, and consequently, realize a significant reduction in the desktop TCO (total cost of ownership).

Host server 104 and client 101 may be configured and managed by host manager 110 of a management server 102 using a variety of network management protocols, such as, for example, SNMP. Configuration information (e.g., parameters) of host 104 and/or client 101 may be stored in a configuration database 111. For example, in a graphics remoting application, host server 104 may be implemented as a VDS server while management server 102 may be implemented as a VDC (virtual desktop control) server.

In one embodiment, server 104 may be a member of a cluster of servers, where each of the member servers of the same cluster is coupled to the same network or the same segment of a network, also referred to as a logical network. In addition, all server members of a cluster may share disk storage 112, for example, over a storage network. In one embodiment, disk 112 may be partitioned into multiple storage locations each corresponding to one of the server members. However, one server member can access a storage location of another server member. Each server member is configured to write certain operating status data into its corresponding storage location periodically.

When management server 102 fails to communicate with a first host over network 103 via a normal network management channel (e.g., SNMP channel), management server 102 may instruct a second host to access the specific storage location associated with the first host for the purpose of retrieving the operating status data of the first host stored herein. Based on the retrieved operating status data, the management server can determine the actual operating conditions of the first host.

As described above, referring to FIG. 1, when management server 102 fails to communicate with host 104 over network 103, there could be two scenarios: 1) network 103 is down while host 104 is running fine; and 2) host 104 is down while network 103 is fine. In this example, it is difficult for management server 102 to determine whether host 104 is actually down when it fails to communicate with host 104. By using a shared storage 112 as a backup communications channel, the management server 102 can determine the operating status of host 104 via another host that shares the storage 112.

In addition, management server 102 can send one or more commands, via the shared disk 112 and another host, to host 104 to be executed by host 104. The result of the execution can also be retrieved from the shared disk 112 via another host. In this situation, the management server 102 and host 104 can communicate with each other, using another host as a proxy, where the shared disk 112 is used as a communications channel between host 104 and another host.

This is useful because when a host is down, the services provided by the host may need to be provided by another host (e.g., a backup or secondary host). If it cannot be determined whether the primary host is down, the services cannot be provided by another host because launching the same VM in another host may corrupt the VM images as they are not designed to be used by more than one host. Even if somehow the storage is protected, it is not feasible to have two VMs potentially responding to clients (e.g., both hosts trying to sell the same stock, etc.) Conventionally, if a host is down, the management server can use an external management tool to send a command over to restart (e.g., to fence) the host. However, if it is cannot be determined whether the host is actually down, a perfectly working host may be incorrectly fenced. By using the mechanism described above, the management server can determine exactly whether the host is down and perform certain operations accordingly.

Figure 2:
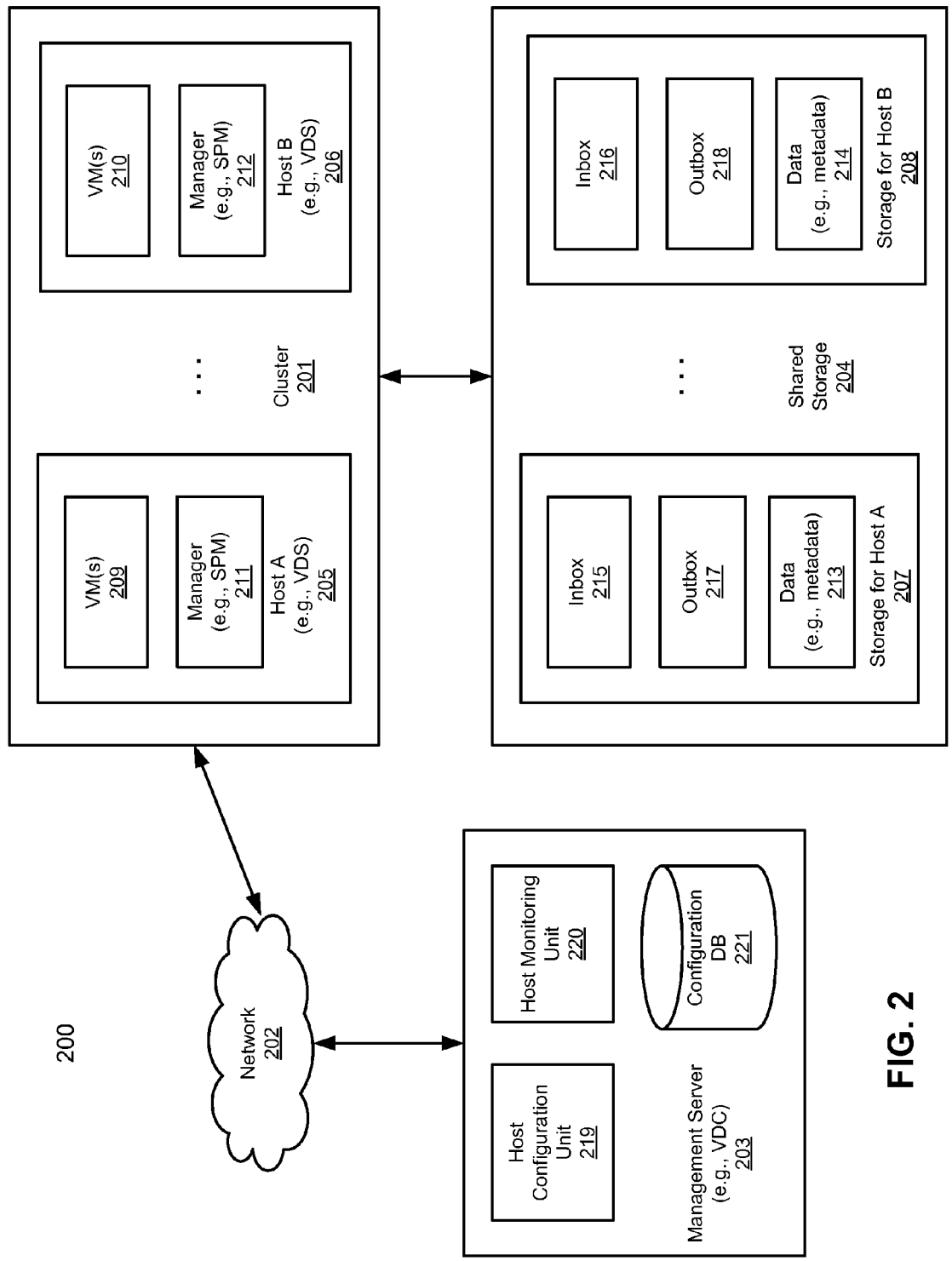
FIG. 2 is a block diagram illustrating an example of a host according to one embodiment.

FIG. 2 is a block diagram illustrating an example of a network configuration according to an alternative embodiment of the invention. For example, hosts 205-206 may be implemented as part of a cluster 201 associated with host 104 (e.g., VDS) and server 203 may be implemented as part of server 102 (e.g., VDC) of FIG. 1. Referring to FIG. 2, hosts 205-206 and management server 203 are communicatively coupled to each other over network 202. Each of the hosts 205-206 may host one or more VMs 209 and 210 respectively. Hosts 205-206 are configured by host configuration unit 219 of management server 203, where the configuration information may be stored in database 221. In addition, management sever 203 includes a host monitoring unit 220 to monitor operating status of hosts 205-206 over network 202 using a variety of network management protocols such as SNMP. For example, host monitoring unit 220 of management server 203 may periodically communicate with managers 211-212 of hosts 205-206 respectively to receive certain signals (e.g., heartbeats) indicating that the respective hosts are operating correctly. Host configuration unit 219 and/or host monitoring unit 220 may be implemented as part of host manager 110 of FIG. 1.

In addition, a shared storage such as a disk 204 is coupled to hosts 205-206. Disk 204 may be coupled to hosts 205-206 over a variety of storage networks or protocols, such as, for example, storage area network (SAN), network file system (NFS), Internet small computer system interface (iSCSI), and/or fibre channel, etc. In one embodiment, disk 204 may be partitioned into multiple segments 207-208, each being associated with one of the hosts 205-206. For example, storage space 207 is associated with host 205 and storage space 208 is associated with host 206. In one embodiment, host 205 is configured to write data representing certain operating status to the corresponding storage area 207, such as, for example, as data 213. Similarly, host 206 is configured to similar data to the corresponding storage area 208 as data 214. For example, data 213-214 may include, but is not limited to, heartbeats, current network or system configuration parameters, operating statistics, etc. This data as a whole is referred to as metadata.

However, these storage spaces 207-208 are accessible by any of the hosts 205-206. For example, host 205 can access (e.g., read or write) data 214 written by host 206. Likewise, host 206 can access data 213 written by host 205. In one embodiment, a host other than an owner of the allocated storage location may only have read access right to the storage location. For example, host 205 can read from and write to data 213 while host 206 can only read from data 213.

Typically, monitoring unit 220 of management server 203 is configured to communicate with managers 211-212 of hosts 205-206 respectively to obtain operating statuses of hosts 205-206 to determine operating conditions of hosts 205-206 using a variety of network management protocols such as SNMP.

When monitoring unit 220 of management server 203 fails to communicate with a first host over network 202 via a normal network management channel (e.g., SNMP channel), management server 203 may instruct a second host to access the specific storage location associated with the first host for the purpose of retrieving the operating status data of the first host stored herein. Based on the retrieved operating status data, the management server can determine the actual operating conditions of the first host.

For example, when management server 203 fails to communicate with manager 211 of host 205 over network 202, host configuration unit 219 and/or monitoring unit 220 may communicate with manager 212 of host 206. In response, manager 212 of host 206 may access data 213 of storage location 207 associated with host 205 to retrieve certain operating status data written by host 205. Manager 212 may then return the data to monitoring unit 220. Based on the data received from host 206, management server 203 can act accordingly. For example, if it is determined that there is problem on network 202 while host 205 is running fine, management server 203 may cause the VM 209 to be migrated to another host such as host 206. If it is determined that there is a problem within host 205, management server 203 may cause the host 205 to shut down or restart.

According to one embodiment, each of storage locations 207-208 includes a first storage area as an inbox area (e.g., inbox areas 215-216) and a second storage area as an outbox area (e.g., outbox areas 217-218). An inbox area is used by a host to read data or commands stored therein while an outbox area is used by a host to write data or output of an execution therein. For example, host 205 may read a command or instruction from inbox area 215 and perform certain operations in response to the command. In one embodiment, a host is configured to periodically read from its corresponding inbox area. The output of the operations may be written back to outbox area 217. In this configuration, instead of communicating with another node over network 202, a host can use the shared storage 204 as a backup communications channel to communicate with another node.

In one embodiment, for the purpose of illustration, when management server 203 fails to communicate with host 205 over network 202, management server 203 can communicate with manager 212 of host 206 to send one or more commands which are then stored into inbox area 215 by manager 212 of host 206. In response to the one or more commands retrieved from inbox area 215, host 205 may performed one or more operations and store an output of the operations to outbox area 217. The data stored in outbox area 217 may be retrieved by manager 212 of host 206, which is then returned to management server 203 over network 202. That is, the management server 203 and host 205 can communicate with each other, using host 206 as a proxy, where the shared disk 204 is used as a communications channel between host 205 and host 206.

For example, if management server 203 determines that there may be a problem within host 205, for example, based on certain operating status data retrieved from data 213 via host 206, management server 203 may send a command to manager 212 of host 206 which in turn is stored in inbox area 217. In response to the command retrieved from inbox area 215, host 205 may perform a reboot or restarting network services, etc. Alternatively, the command may cause host 205 to shut down, releasing any resources used by host 205. Similarly, if management server 203 determines that there may be a problem on network 202 while host 205 is running fine, management server 203 may send a command via inbox area 215 to cause VM 209 of host 205 to be migrated to another host. Note that some or all of the components as shown in FIG. 2 may be implemented in software, hardware, or a combination of both.

Figure 3:
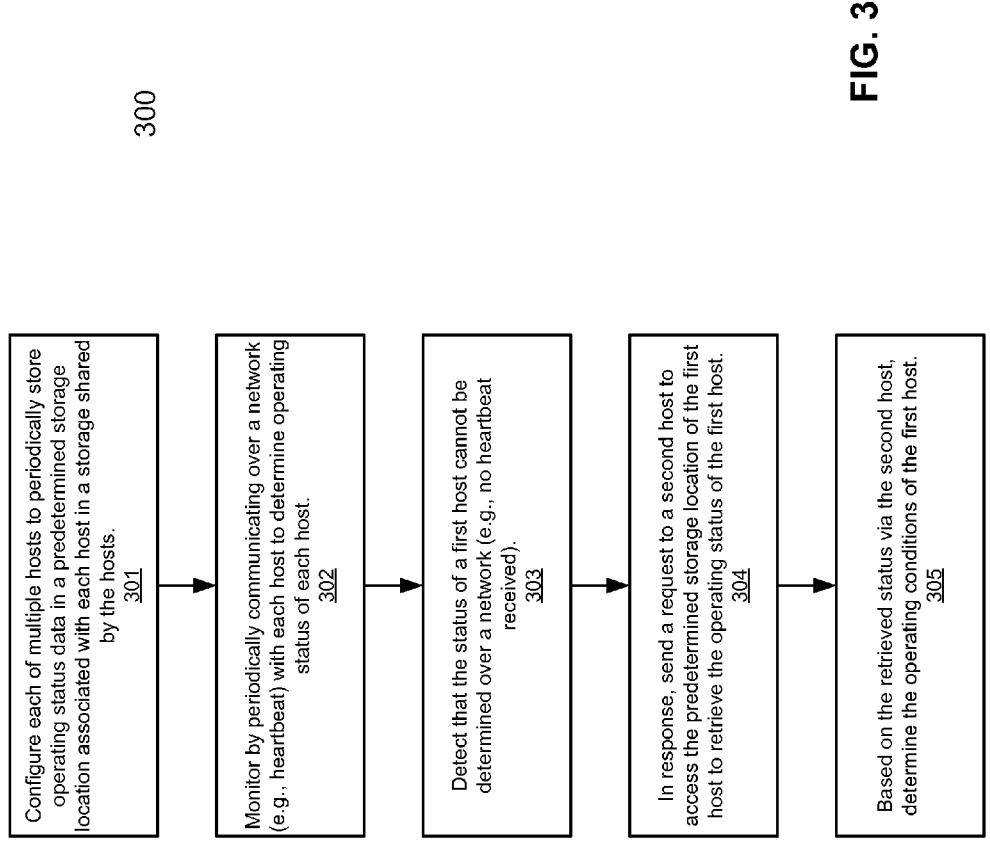
FIG. 3 is a flow diagram illustrating a method for automatically configuring a network interface of a host according to one embodiment.

FIG. 3 is a flow diagram illustrating a method for determining operating conditions of a host according to one embodiment. Note that method 300 may be performed by processing logic which may include software, hardware, or a combination of both. For example, method 300 may be performed by host configuration unit 219 and/or host monitoring unit 220 of FIG. 2. Referring to FIG. 3, at block 301, each of multiple hosts is configured to periodically store certain operating status data in a predetermined storage location associated with each host in a storage disk shared by all of the hosts. These hosts may be associated with a cluster of servers in a datacenter. At block 302, processing logic periodically monitors each host over a network to determine operating status of each host, using a variety of network management protocols such as SNMP. At block 303, if it is detected that the status of a first node cannot be obtained over the network, a request is sent to a second host to access the predetermined storage location associated with the first host to retrieve the operating status of the first host at block 304. Based on the retrieved status data via the second host, at block 305, the operating conditions of the first host is determined.

Figure 4:
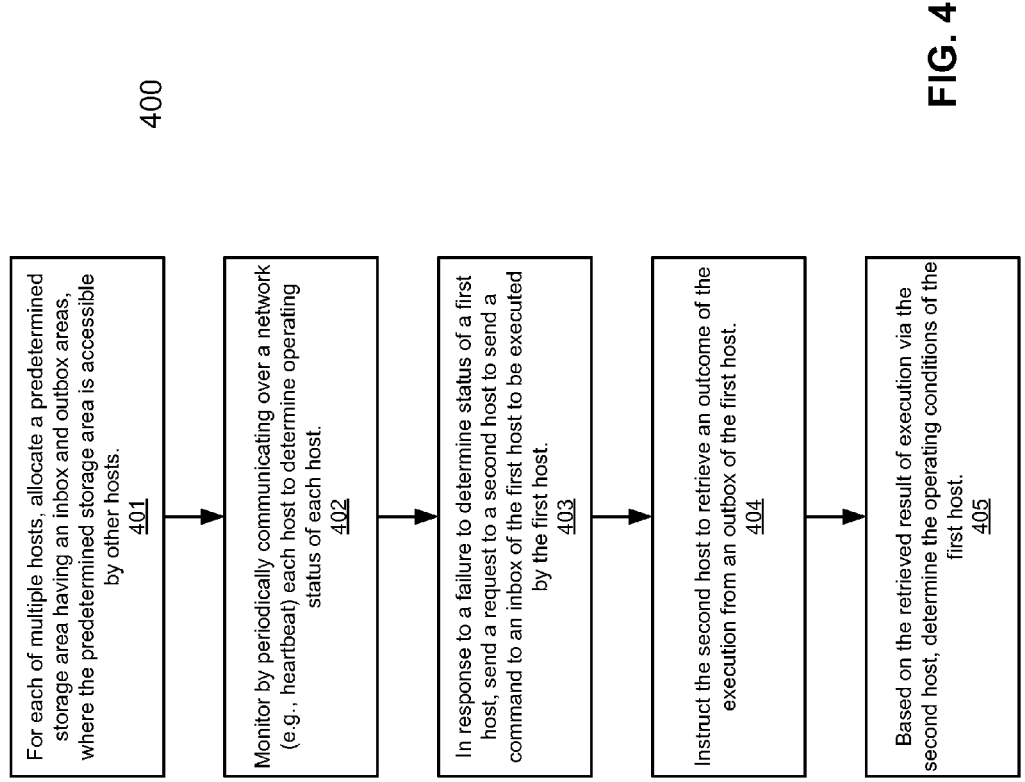
FIG. 4 is a flow diagram illustrating a method for determining operating conditions of a host according to another embodiment.

FIG. 4 is a flow diagram illustrating a method for determining operating conditions of a host according to another embodiment. Note that method 400 may be performed by processing logic which may include software, hardware, or a combination of both. For example, method 400 may be performed by network configuration 200 of FIG. 2. Referring to FIG. 4, for each of multiple hosts, at block 401, a predetermined storage area is allocated having an inbox area and an outbox area, where the predetermined storage area is accessible by another host. At block 402, processing logic periodically monitors each host over a network to determine operating status of each host. In response to a failure to determine operating status of a first host over a network, at block 403, a request is sent to a second host instructing the second host to send a command into an inbox area associated with the first node, where the command is to be executed by the first node and the result of the execution is stored in an outbox area of the first host. At block 404, the second host retrieves an outcome of the execution from the outbox area of the first host. At block 405, based on the data obtained from the outbox area of the first host, processing logic determines operating conditions of the first host.

Figure 5:
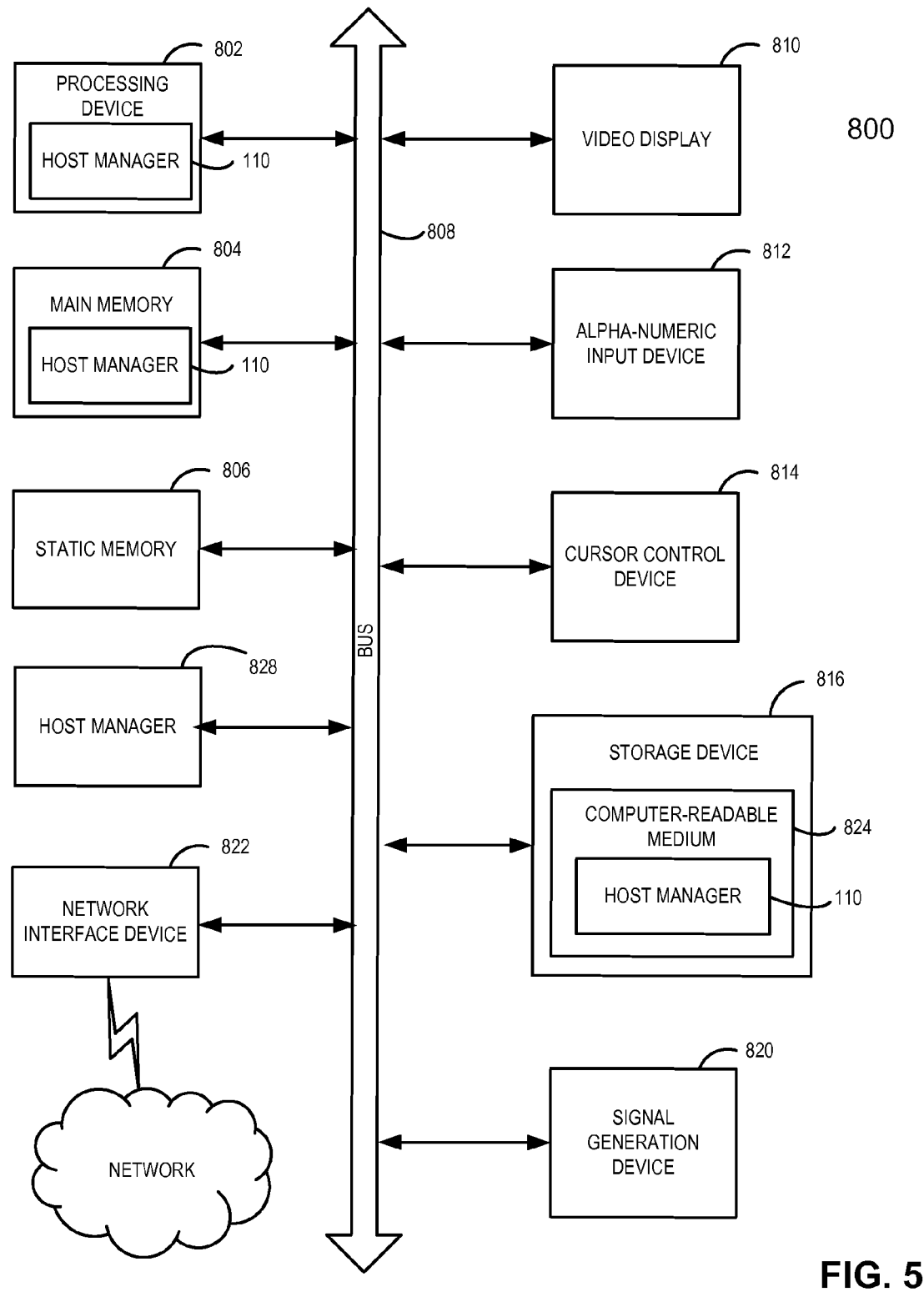
FIG. 5 illustrates a diagrammatic representation of a machine in the exemplary form of a computer system which may be used with an embodiment of the invention.

FIG. 5 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 816, which communicate with each other via a bus 808.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute the instructions 110 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-accessible storage medium 824 (also known as a machine-readable storage medium or a computer-readable medium) on which is stored one or more sets of instructions or software (e.g., host manager 110) embodying any one or more of the methodologies or functions described herein. The host manager 110 may also reside, completely or at least partially, within the main memory 804 and/or within the processing device 802 during execution thereof by the computer system 800, the main memory 804 and the processing device 802 also constituting machine-accessible storage media. The host manager 110 may further be transmitted or received over a network via the network interface device 822.

The computer-readable storage medium 824 may also be used to store the host manager 110 persistently. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 828, components and other features described herein can be implemented as discrete hardware components or integrated in the functionality of hardware components such as ASICS, FPGAs, DSPs or similar devices. In addition, the modules 828 can be implemented as firmware or functional circuitry within hardware devices. Further, the modules 828 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Thus, techniques for monitoring operating statuses of a host have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "monitoring" or "instructing" or "determining" or "transmitting" or "receiving" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A computer-implemented method comprising:
monitoring, by a management server, an operating status for each of a plurality of hosts over a network using a network management protocol;
in response to a failure to obtain the operating status of a first host over the network using the network management protocol, instructing, by the management server when communicating with a second host, the second host to access a predetermined storage location to obtain an operating status of the first host, wherein the predetermined storage location is specifically allocated for the first host from a storage space shared by the plurality of hosts; and
determining, by the management server, an operating condition of the first host based on the operating status obtained via the second host.

2. The method of claim 1, wherein each host is specifically allocated with a storage location from the shared storage space, and wherein each host is configured to periodically store an operating status to an associated storage location.

3. The method of claim 2, wherein each allocated storage location of each host comprises an inbox area and an outbox area, wherein each host is configured to read a command from the inbox area, to perform one or more operations based on the command, and to store an output of the operations to the outbox area.

4. The method of claim 3, further comprising:
transmitting a command to the second host, wherein the second host stores the command to an inbox area of the predetermined storage location associated with the first host, wherein the first host is configured to perform one or more operations in response to the command stored in the inbox area;
receiving via the second host an outcome of the one or more operations stored by the first host in an outbox area of the predetermined storage location associated with the first host; and
determining a plurality of operating conditions of the first host based on the outcome of the one or more operations.

5. The method of claim 4, wherein the first host hosts one or more virtual machines (VMs), each VM hosting one or more applications to be accessed by one or more clients over the network.

6. The method of claim 5, wherein if it is determined there is a problem on the network based on the operating status obtained via the second host, the command transmitted to the second host causes the first host to migrate the one or more VMs to a third host.

7. The method of claim 5, wherein if it is determined there is a problem within the first host based on the operating status obtained via the second host, the command transmitted to the second host causes the first host to shut down or restart.

8. A non-transitory computer-readable storage medium including instructions that, when executed by a processing device, cause the processing device to perform a method comprising:
monitoring, by the processing device, an operating status for each of a plurality of hosts over a network using a network management protocol;
in response to a failure to obtain the operating status of a first host over the network using the network management protocol, instructing, by the processing device when communicating with a second host, the second host to access a predetermined storage location to obtain an operating status of the first host, wherein the predetermined storage location is specifically allocated for the first host from a storage space shared by the plurality of hosts; and
determining, by the processing device, an operating condition of the first host based on the operating status obtained via the second host.

9. The non-transitory computer-readable storage medium of claim 8, wherein each host is specifically allocated with a storage location from the shared storage space, and wherein each host is configured to periodically store an operating status to an associated storage location.

10. The non-transitory computer-readable storage medium of claim 9, wherein each allocated storage location of each host comprises an inbox area and an outbox area, wherein each host is configured to read a command from the inbox area, to perform one or more operations based on the command, and to store an output of the operations to the outbox area.

11. The non-transitory computer-readable storage medium of claim 10, wherein the method further comprises:
transmitting a command to the second host, wherein the second host stores the command to an inbox area of the predetermined storage location associated with the first host, wherein the first host is configured to perform one or more operations in response to the command stored in the inbox area;

receiving via the second host an outcome of the one or more operations stored by the first host in an outbox area of the predetermined storage location associated with the first host; and determining operating conditions of the first host based on the outcome of the one or more operations.

12. The non-transitory computer-readable storage medium of claim 11, wherein the first host hosts one or more virtual machines (VMs), each VM hosting one or more applications to be accessed by one or more clients over the network.

13. The non-transitory computer-readable storage medium of claim 12, wherein if it is determined there is a problem on the network based on the operating status obtained via the second host, the command transmitted to the second host causes the first host to migrate the one or more VMs to a third host.

14. The non-transitory computer-readable storage medium of claim 12, wherein if it is determined there is a problem within the first host based on the operating status obtained via the second host, the command transmitted to the second host causes the first host to shut down or restart.

15. A system, comprising:
a host monitoring unit, executable by a processing device, to monitor an operating status for each of a plurality of hosts over a network using a network management protocol; and
a host configuration unit coupled to the host monitoring unit to, in response to a failure to obtain the operating status of a first host over the network using the network management protocol and when communicating with a second host, instruct the second host to access a predetermined storage location to obtain an operating status of the first host, wherein the predetermined storage location is specifically allocated for the first host from a storage space shared by the plurality of hosts, wherein the host monitoring unit is configured to determine an operating condition of the first host based on the operating status obtained via the second host.

16. The system of claim 15, wherein each host is specifically allocated with a storage location from the shared storage space, and wherein each host is configured to periodically store an operating status to an associated storage location.

17. The system of claim 16, wherein each allocated storage location of each host comprises an inbox area and an outbox area, wherein each host is configured to read a command from the inbox area, to perform one or more operations based on the command, and to store an output of the operations to the outbox area.

18. The system of claim 17, wherein the host configuration unit is further configured to
transmit a command to the second host, wherein the second host stores the command to an inbox area of the predetermined storage location associated with the first host, wherein the first host is configured to perform one or more operations in response to the command stored in the inbox area,
receive via the second host an outcome of the one or more operations stored by the first host in an outbox area of the predetermined storage location associated with the first host, wherein the outcome of the one or more operations is used to determine operating conditions of the first host.

19. The system of claim 18, wherein the first host hosts one or more virtual machines (VMs), each VM hosting one or more applications to be accessed by one or more clients over the network.

20. The system of claim 19, wherein if it is determined there is a problem on the network based on the operating status obtained via the second host, the command transmitted to the second host causes the first host to migrate the one or more VMs to a third host.

21. The system of claim 19, wherein if it is determined there is a problem within the first host based on the operating status obtained via the second host, the command transmitted to the second host causes the first host to shut down or restart.

* * * * *